United States Patent [19]

Bruce, II

[11] Patent Number: 5,265,212
[45] Date of Patent: Nov. 23, 1993

[54] SHARING OF BUS ACCESS AMONG MULTIPLE STATE MACHINES WITH MINIMAL WAIT TIME AND PRIORITIZATION OF LIKE CYCLE TYPES

[75] Inventor: E. William Bruce, II, Lunenberg, Mass.

[73] Assignee: Digital Equipment Corporation, Maynard, Mass.

[21] Appl. No.: 861,637

[22] Filed: Apr. 1, 1992

[51] Int. Cl.⁵ ............................................. G06F 13/14
[52] U.S. Cl. ................................. 395/325; 395/725; 364/242.91; 364/242.92; 364/DIG. 1; 364/937.01; 364/DIG. 2
[58] Field of Search .......... 395/325, 425, 725; 364/242.92, 242.91, DIG. 1, 937.01, DIG. 2

[56] References Cited

U.S. PATENT DOCUMENTS

| | | | |
|---|---|---|---|
| 4,281,381 | 7/1981 | Ahuja et al. | 364/200 |
| 4,384,324 | 5/1983 | Kim et al. | 364/200 |
| 4,453,214 | 6/1984 | Adcock | 395/425 |
| 4,481,572 | 11/1984 | Ochsner | 364/200 |
| 4,541,043 | 9/1985 | Ballegeer et al. | 364/200 |
| 4,633,394 | 12/1986 | Georgiou et al. | 364/200 |
| 4,719,569 | 1/1988 | Ludemann et al. | 395/725 |
| 4,779,089 | 10/1988 | Theus | 340/825.5 |
| 4,794,516 | 12/1988 | Auerbach et al. | 364/200 |
| 4,814,974 | 3/1989 | Narayanan et al. | 364/200 |
| 4,858,173 | 8/1989 | Stewart et al. | 364/900 |
| 4,881,195 | 11/1989 | DeLong et al. | 364/900 |
| 4,897,833 | 1/1990 | Kent et al. | 370/85.2 |
| 4,920,486 | 4/1990 | Nielsen | 364/200 |
| 4,922,413 | 5/1990 | Stoughton et al. | 364/200 |
| 5,016,167 | 5/1991 | Nguyen et al. | 395/725 |
| 5,043,874 | 8/1991 | Gagliardo et al. | 364/200 |
| 5,146,564 | 9/1992 | Evans et al. | 395/250 |
| 5,179,705 | 1/1993 | Kent | 395/725 |

OTHER PUBLICATIONS

D. J. Natusch et al., "The Memory System in the VAX 8800 Family," Digital Technical Journal No. 4, Digital Equipment Corporation, Maynard, Mass., Feb. 1987.

*Primary Examiner*—Michael R. Fleming
*Assistant Examiner*—Glenn A. Auve
*Attorney, Agent, or Firm*—Arnold, White & Durkee

[57] ABSTRACT

Conflicting users of a shared resource are controlled by respective state machines having cross-coupled busy signals permitting each user to proceed with exclusive use of the shared resource when the other users are finished using the resource. Priority logic responsive to service requests issues grant signals to the state machines so that the state machines do not permit their respective users to begin simultaneously exclusive use of the resource. Preferably, each state machine also receives the requests for service of its respective user. Each state machine, for example, has an idle state, a first state reached from the idle state in response to a service request; a second state reached from the first state in response to a grant signal; and a third state reached from the second state, unless the busy signal of another state machine is asserted. Preferably, each state machine is responsive to a request having different preassigned priorities. The priority logic arbitrates among requests for services of different users, and each state machine arbitrates among the requests of different priorities for the service of its respective user. In a specific example, the users are DRAM memory banks that share a common data bus. The requests include read requests, write requests, and refresh requests. Read requests are given priority over write requests.

24 Claims, 14 Drawing Sheets (CONTINUES IN FIG. 12)

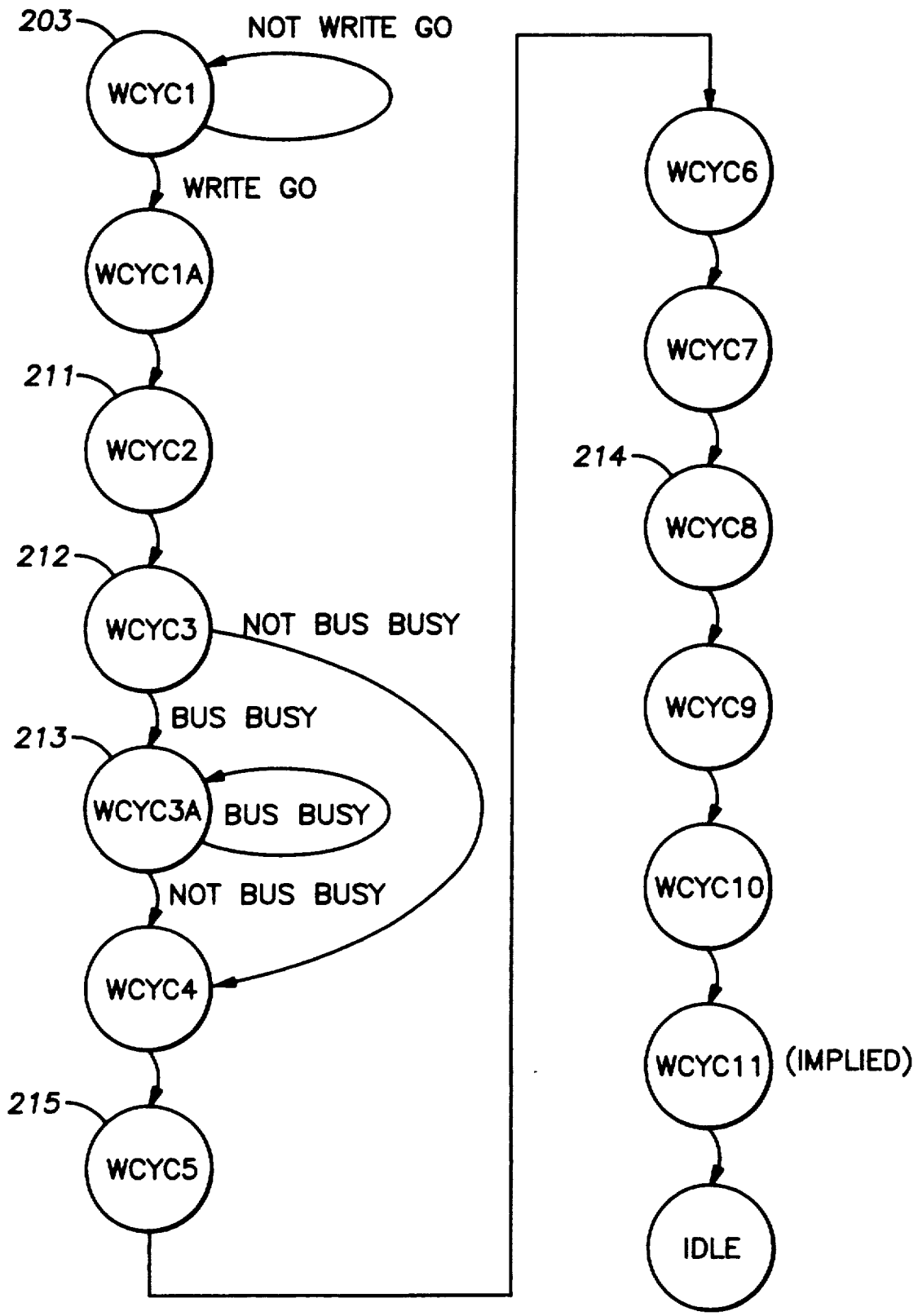
FIG. 14 (CONTINUES IN FIG. 12)

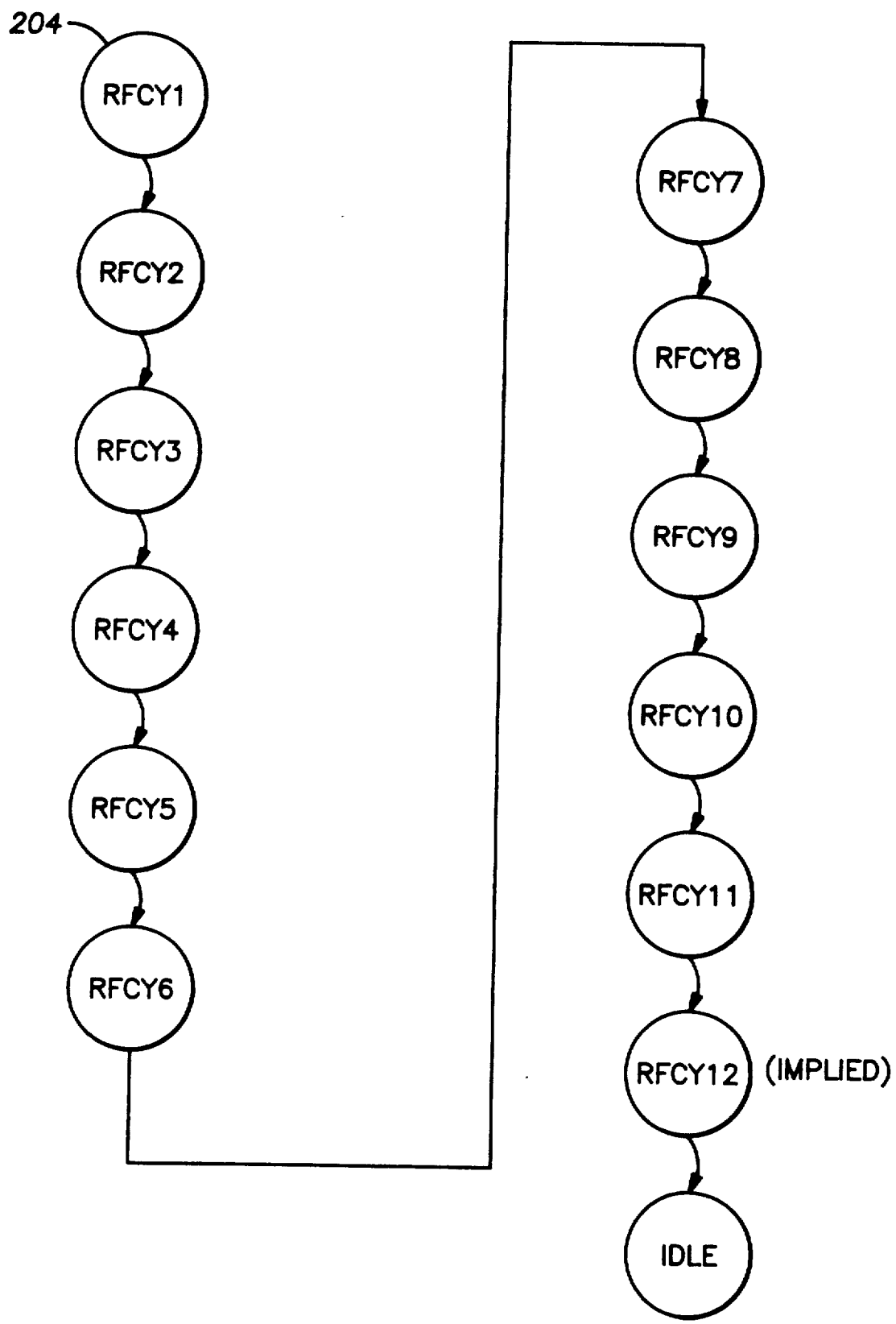
FIG. 15 (CONTINUES IN FIG. 12)

SHARING OF BUS ACCESS AMONG MULTIPLE STATE MACHINES WITH MINIMAL WAIT TIME AND PRIORITIZATION OF LIKE CYCLE TYPES

BACKGROUND OF THE INVENTION

1. Technical Field

The present invention relates generally to arbitration among conflicting users of a shared resource in a digital electronic system. The present invention more particularly relates to arbitration among state machines that each control a respective one of the conflicting users and have a sequence of states preparing the respective user for access to the shared resource. In a specific embodiment, the state machines are timing generators for dynamic random access memory banks (DRAMs) that share a common data bus in a digital computer system.

2. Background Art

In a digital computer system, it is possible to exchange data over a bus at a rate that is much higher than the rate at which data can be generated or used by a single system unit. Therefore, it is conventional to use a common bus for interconnecting a multiplicity of system units such as central processors, input/output units, and memory units. For design flexibility, it is desirable for the system units to operate in an autonomous fashion such that more than one system unit may have a need for access to the bus at the same time. For economy, however, the bus may not have sufficient data transmission capacity to service all of the conflicting users at the same time Therefore, some kind of arbitration scheme is required for deciding which of the users are to be granted priority and serviced immediately.

In one conventional arbitration scheme, arbitration logic responds to all outstanding requests on a rotational basis such that priority is given to the system unit having been denied access for the longest period of time. The system unit granted priority is given exclusive access to the shared resource until a predefined operation is completed. Upon completion of the operation, another system unit is granted priority In a refinement of this rotational scheme, each system unit may perform one of a plurality of predefined operations, and each operation is assigned to one of a plurality of priority groups. The arbitration logic preferentially grants priority to system units requesting operations from the higher priority groups, and grants priority to system units requesting operations from the lower priority groups after the higher priority operations have been performed or only after the lower priority operations have been delayed for a prolonged period of time.

As described above, conventional arbitration schemes can ensure a high degree of autonomy, fairness, and efficient use of a shared resource. In many systems, however, the conflicting operations of the system units are so frequent and interrelated that considerable processing time of the system units is lost in the process of requesting access to the shared resource. In many cases, this loss of available processing time is not evident because the system units are nevertheless performing useful operations, but these operations are not performed in the most efficient manner due to inefficient coordination with conflicting operations.

One example of contention of frequent and interrelated operations is the shared use of a data bus by interleaved memory banks. During a multi-word operation over consecutive word addresses, both memory banks are alternately accessed The conventional storage elements are dynamic random access memories (DRAMs) which have cycle times that are much longer than the data set-up and transfer time over their data terminals. In a similar fashion, the data set-up and transfer times are much longer than the data transfer time over a high-speed computer bus. These factors dictate the use of shared data buses. Moreover, continual improvements in semiconductor manufacturing and packaging techniques have increased the density and memory capacity of the packaged DRAM chips to the point where the density of interconnections of address, data and control wiring is a limiting factor. Consequently, it is desirable to provide a fair and efficient scheme for arbitrating access to the common data bus interconnecting the data terminals of the DRAMs in the interleaved memory banks This arbitration scheme, however, should also permit the DRAM chips to be controlled in a most efficient manner such that the DRAMs are sequenced uninhibited up to the point where the shared data bus is needed, and the DRAMs are inhibited only so long as the data bus is needed by another memory bank.

SUMMARY OF THE INVENTION

Briefly, in accordance with the present invention, a digital electronic system for controlling conflicting users of a shared resource includes respective cross-coupled state machines that each permit a respective user to proceed with exclusive use of the shared resource when the other users are finished using the shared resource, and priority logic that prevents conflict among the cross-coupled state machines so that a plurality of the state machines do not permit their respective users to begin simultaneous exclusive use of the shared resource. The state machines are cross-coupled so that each state machine provides a "busy" signal to the other state machines. The priority logic is responsive to simultaneous requests for the services of different users, and issues a grant signal to either one or another of the state machines. Each state machine has a sequence of states during which exclusive use of the share resource is required by its respective user. Each state machine has combinational logic preventing sequencing to states requiring exclusive use of the shared resource unless the state machine receives a respective grant signal from the priority logic and does not receive a busy signal from another state machine Preferably, each state machine receives its respective request signal as well as the respective grant signal, so that the state machine may control preparatory operations before receiving the grant signal. In a preferred arrangement, the state machine transitions from an idle state to a first state in a sequence of states in response to its respective request signal. The state machine transitions from the first state to a second state in the sequence in response to its respective grant signal. The state machine transitions from the second state to a third state in the sequence unless the busy signal of another state machine is asserted. In the third state, the state machine transmits its busy signal to the other state machines. The state machine stops transmitting the busy signal when it is no longer controlling exclusive use of the shared resource.

Preferably, each state machine is responsive to a plurality of requests having preassigned priorities. The priority logic arbitrates among requests for services of different users. Each state machine arbitrates among requests of different priority for the services of its respective user. Each state machine, for example, has combinational logic that arbitrates among the requests of different priority when deciding a next state following an idle state.

In a specific example, the users are DRAM memory banks that require exclusive use to a shared data bus. In this case the requests include read requests, write requests, and refresh requests Each state machine has a sequence of states corresponding to each kind of request. The combinational logic governs transitions from the idle state to the first state in each of these sequences so that refresh requests are given priority over read and write requests, and read requests are given priority over write requests.

BRIEF DESCRIPTION OF THE DRAWINGS

Other objects and advantages of the invention will become apparent upon reading the following detailed description with reference to the drawings, in which:

FIG. 14 is a third portion of the state diagram showing a series of states for controlling a memory bank to perform a write operation; and FIG. 15 is a fourth portion of the state diagram showing a series of states for controlling a memory bank to perform a refresh operation.

Figure 1:
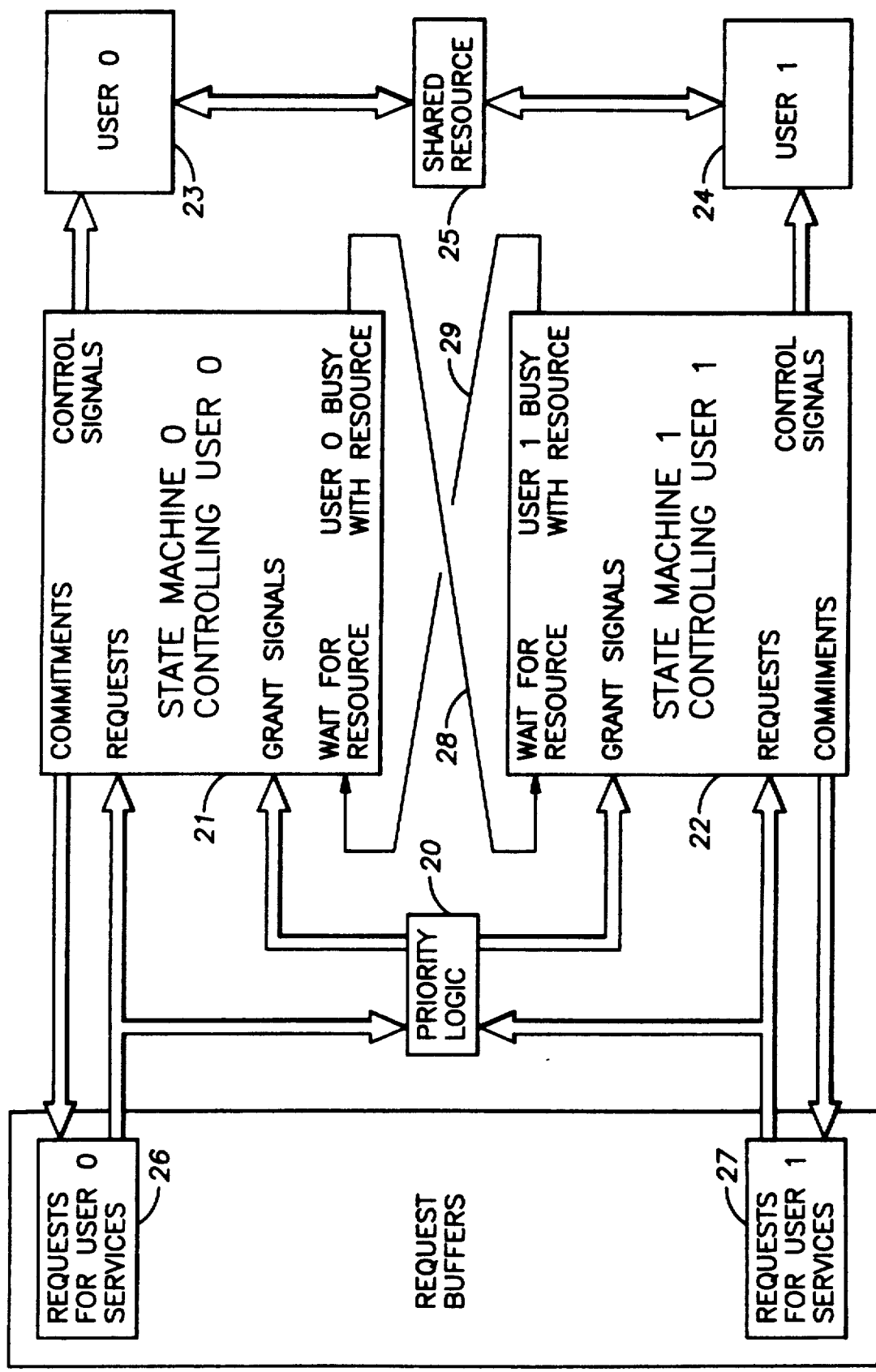
FIG. 1 is a block diagram showing two state machines arranged according to the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the scope of the invention as defined by the appended claims.

DESCRIPTION OF THE PREFERRED EMBODIMENT

Turning now to the drawings, there is shown in FIG. 1 a block diagram illustrating the most basic aspects of the present invention. The present invention involves the use of priority logic 20, together with a plurality of state machines 21, 22 controlling respective conflicting users 23, 24 of a shared resource 25. Each of the state machines 21, 22 has logic and memory components such as latches or flip-flops to define a series of states. A state machine is defined by such a series of states, and, in particular, the way in which the "next state" of the machine is determined by its "present state" and inputs to the state machine. A state machine also has outputs which are a logical function of the state machine's present state and possibly inputs to the state machine. As shown in FIG. 1, a first state machine 21 receives as inputs requests from a request buffer 26 and grant signals from priority logic 20. The second state machine 22 receives as inputs requests from a request buffer 27 and grants signals from the priority logic 20. The first state machine 21 has outputs used as control signals for controlling the first user 23. The second state machine 22 has outputs used as control signals for controlling the second user 24.

In accordance with an important aspect of the present invention, the state machines 21, 22 have cross-coupled connections 28, 29 which control sequencing of each of the state machines 21, 22 at certain "critical" states where the shared resource 25 becomes necessary for further processing of the request, and, if the resource is already being used, where the processing of the request must be delayed until the shared resource 25 is no longer being used by the other state machine. If two state machines, however, reach such a critical state at the same time, then the cross-coupled connections 28, 29 are not sufficient to prevent conflict. In order to prevent such conflict that would otherwise occur with the cross-coupled connections, the priority logic 20 detects any occurrence of a situation in which the shared resource would simultaneously be required for further processing of a request for the services of the first user and a request for services of the second user. In particular, the priority logic 20 asserts grant signals to the state machines to control the sequencing of the state machines to the critical states.

Preferably, each state machine receives the requests for services as well as the grant signals so that a state machine, if otherwise not busy, may begin acting on a request even before receiving a grant signal for the request. At a critical state or some state prior to it in a series of states for processing the request, sequencing of the state machine is temporarily delayed if the grant signal is not asserted by the priority logic 20. Sometime after receiving the grant signal, the state machine will process a request to the point at which completion of the request is certain. At this point, the state machine may send a commitment signal or acknowledgement back to the respective request buffer 26, 27 in order to clear the request from the request buffer to make room for further requests.

Figure 2:
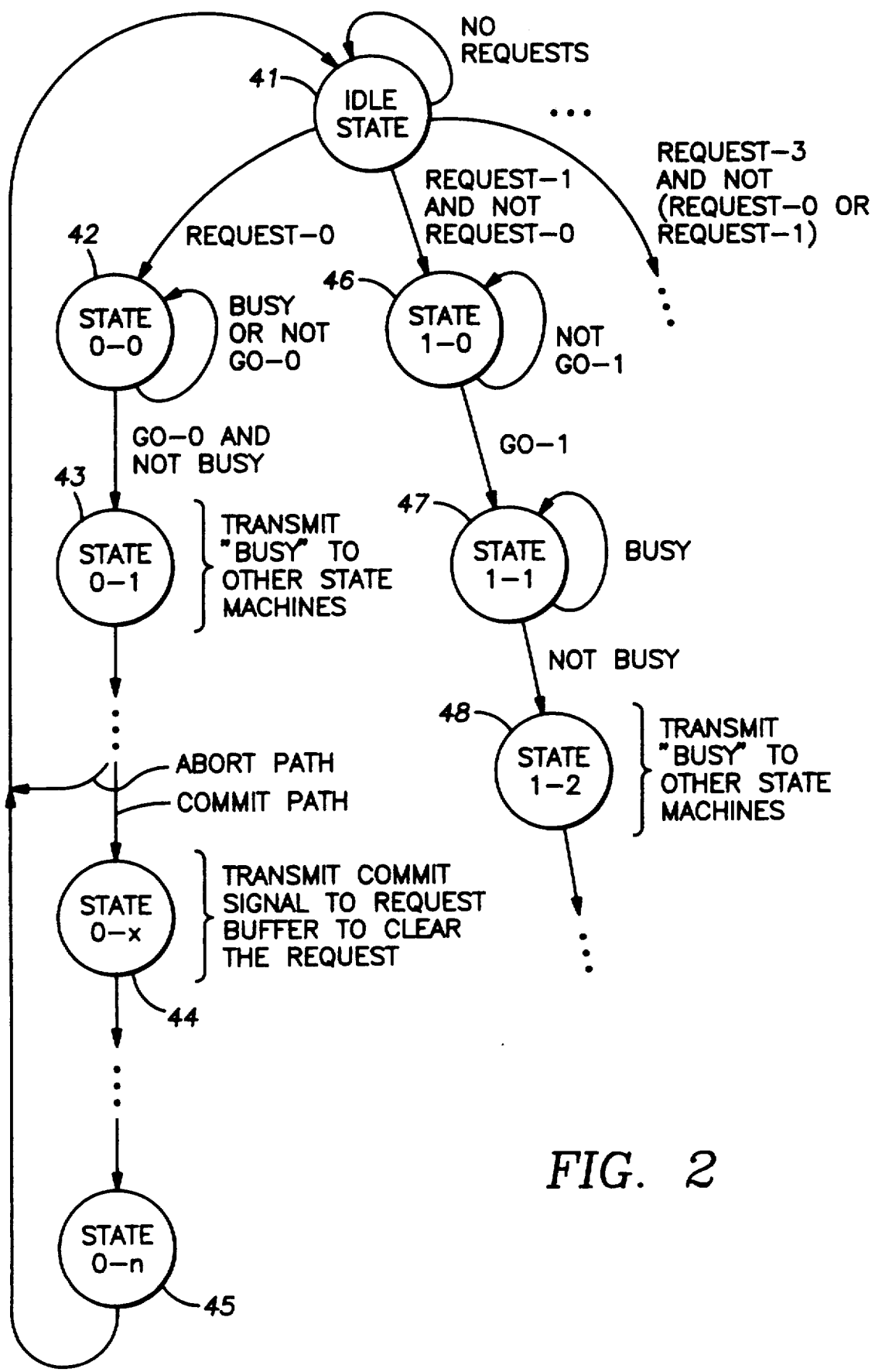
FIG. 2 is a state diagram applicable to each one of the of FIG. 1.

Turning now to FIG. 2, there is shown a state diagram applicable to each one of the state machines 21, 22 of FIG. 1. When the digital electronic system of FIG. 1 is first powered on or after processing for a request that is aborted or completed, the state machine reaches an idle state 41 and remains in the idle state until receiving a request. The state machine then enters a new state that begins a sequence of states corresponding to the request. If the state machine receives a REQUEST-0 signal, for example, the state machine enters the first state 42 in a sequence of states (STATE 0-0, STATE 0-1, . . ., STATE 0-n) for processing the request. The state 42 is a critical state, in which the shared resource becomes necessary for further processing REQUEST-0. Therefore, the state machine does not sequence to the next state 43 if the other state machine is busy using the shared resource. Also, grant signal GO-0 from the priority logic controls the sequencing of the state machine from the state 42 looping back to state 42 or on to state 43. It is assumed that in the state 43 of the sequence, the state machine controls use of the shared resource and therefore transmits a busy signal to the other state machines. When the state machine is finished controlling the resource, then the state machine no longer transmits the busy signal.

At some point in the sequence for processing the request, the state machine will become committed to completing the requested operation. At some point in this "commit path," such as the state 44, the state machine transmits a "commit signal" to the request buffer to clear the request being processed. In general, this commit signal should be transmitted as early as possible so long as the priority logic (20 in FIG. 1) can prevent simultaneous sequencing from critical states in more than one of the state machines. After a final state 45 in the sequence, the state machine assumes its idle state 41.

The sequence of states for processing other requests is similar, but the processing of the other requests may require the use of the resource at different positions in the sequence. The sequence for a REQUEST-1, for example, starts in state 46 from the idle state 41 when a REQUEST-1 signal but not the REQUEST-0 signal is received. As should be apparent from FIG. 2, the state machine itself prioritizes the processing of requests submitted to it simultaneously. The state machine remains in state 46 until receiving a grant signal (GO-1) for REQUEST-1. Once the request is granted, then the state machine enters a critical state 47 and remains in state 47 until the resource is no longer being used by any other state machine. Once the resource is free, the state machine proceeds to a state 48 where the state machine transmits a "busy" signal to the other state machine and begins controlling use of the shared resource.

The sequence of states 46, 47, 48 is similar to the sequence of states 42, 43, except for the addition of state 47. In state 47, the state machine could control a preparatory operation that should not be performed until the request has been granted, but which should be performed prior to use of the shared resource. Further advantages of the present invention will become apparent from a specific embodiment.

Figure 3:
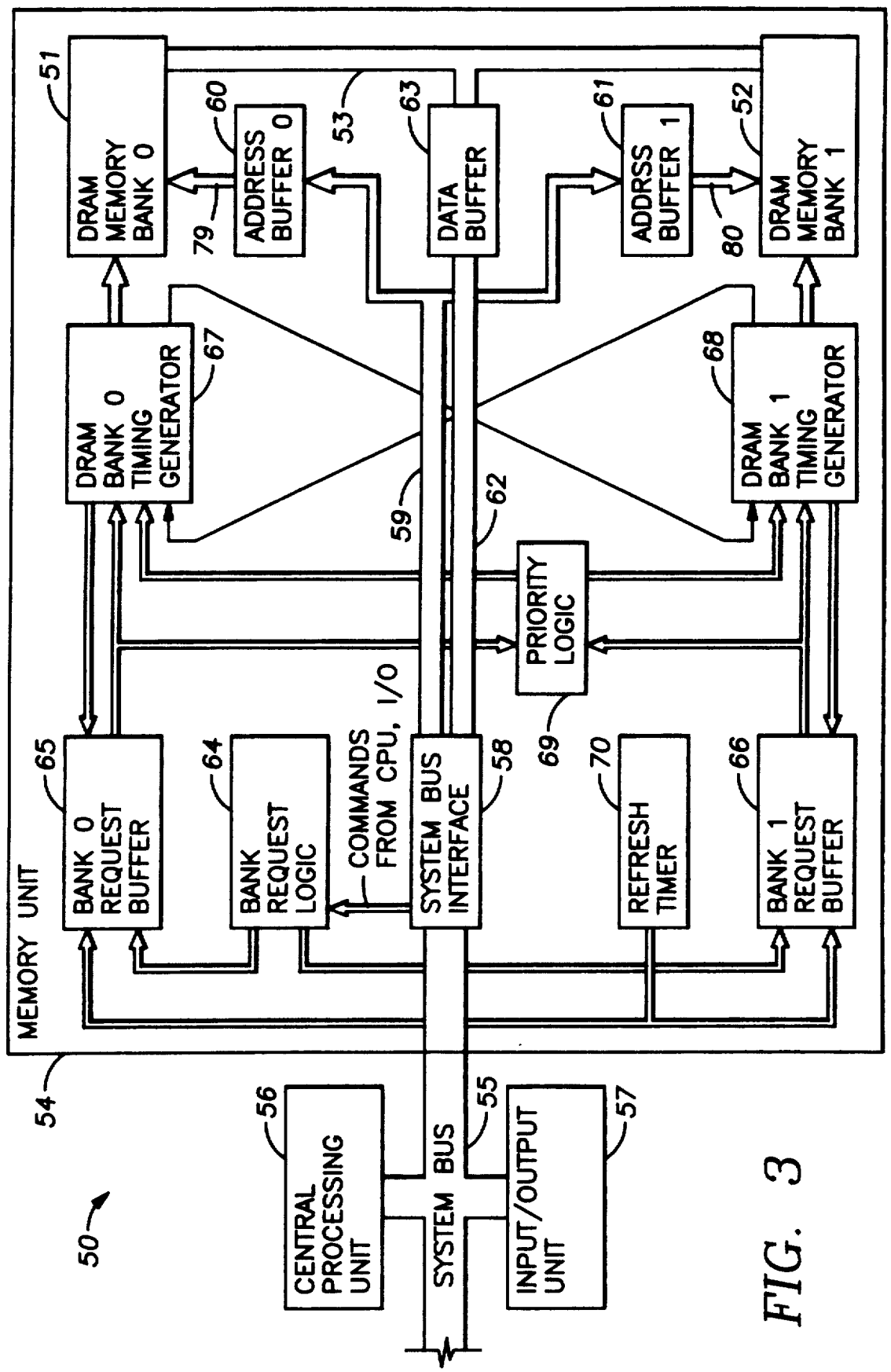
FIG. 3 is a block diagram of a computer system incorporating the present invention for controlling a pair of dynamic random access memory banks sharing a common data bus.

Turning now to FIG. 3, there is shown a block diagram of a digital computer generally designated 50 using the present invention for controlling a pair of dynamic random access memory (DRAM) banks 51, 52 that share a common data bus 53. The DRAM memory banks 51, 52 are part of a memory unit 54 which is coupled by a system bus 55 to a central processing unit 56 and an input/output unit 57.

To access the DRAM memory banks 51, 52, the central processing unit 56 asserts a memory command and a memory address on the system bus 55. The memory command is recognized by a system bus interface 58 in the memory unit 54. The address is conveyed by an internal address bus 59 to a respective one of two address buffers 60, 61, depending upon whether either the first DRAM memory bank 51 or the second DRAM memory bank 52 is addressed. For a write command, the central processing unit 56 also transmits write data on the system bus 55. The system bus interface 58 transfers the write data over an internal data bus 62 to a bi-directional data buffer 63.

Depending upon the memory command issued by the central processing unit, the DRAM memory banks 51, 52 may need to perform one or more read or write cycles, either individually or cooperatively. Bank request logic 64 decodes the commands from the central processing unit into separate read and write requests for each of the two memory banks 51, 52. Requests for access to memory in the first bank 51 are placed in a first request buffer 65, and requests for access to memory in the second memory bank 52 are placed in a second request buffer 66. The precise construction of the system bus interface 58 and the bank request logic 64 depends upon the organization of the system bus 55 and the memory command architecture recognized by the system bus interface 58 Although these details are not essential to practicing the present invention, a suitable construction for the system bus and the system bus interface 58, as well as a specific memory command structure, can be found in Gagliardo et al., U.S. Pat. No. 5,043,874, issued Aug. 22, 1991, and incorporated herein by reference.

The bank request buffers 65, 66 also periodically receive refresh requests from a refresh timer 70. The refresh requests are recognized by the DRAM timing generators 67, 68 to control refresh operations upon the DRAMs. The DRAMs will fail to retain stored data unless the refresh operations are performed periodically.

In accordance with the present invention, there are provided two cross-coupled DRAM memory bank timing generators 67, 68 which receive memory access requests from the respective request buffers 65, 66 and assert control signals to the DRAM memory banks 51, 52. The DRAM memory bank timing generators 67, 68 are also responsive to grant signals from priority logic 69 which prevents contention or deadlock from otherwise occurring by the simultaneous cross-coupling of busy signals between the DRAM memory bank timing generators 67, 68. In additional to directly controlling the DRAM memory banks 51, 52, the DRAM memory bank timing generators 67, 68 also provide signals for controlling the address buffers 60, 61, the data buffer 63, and controlling the clearing of requests from the request buffers 65, 66.

Figure 4:
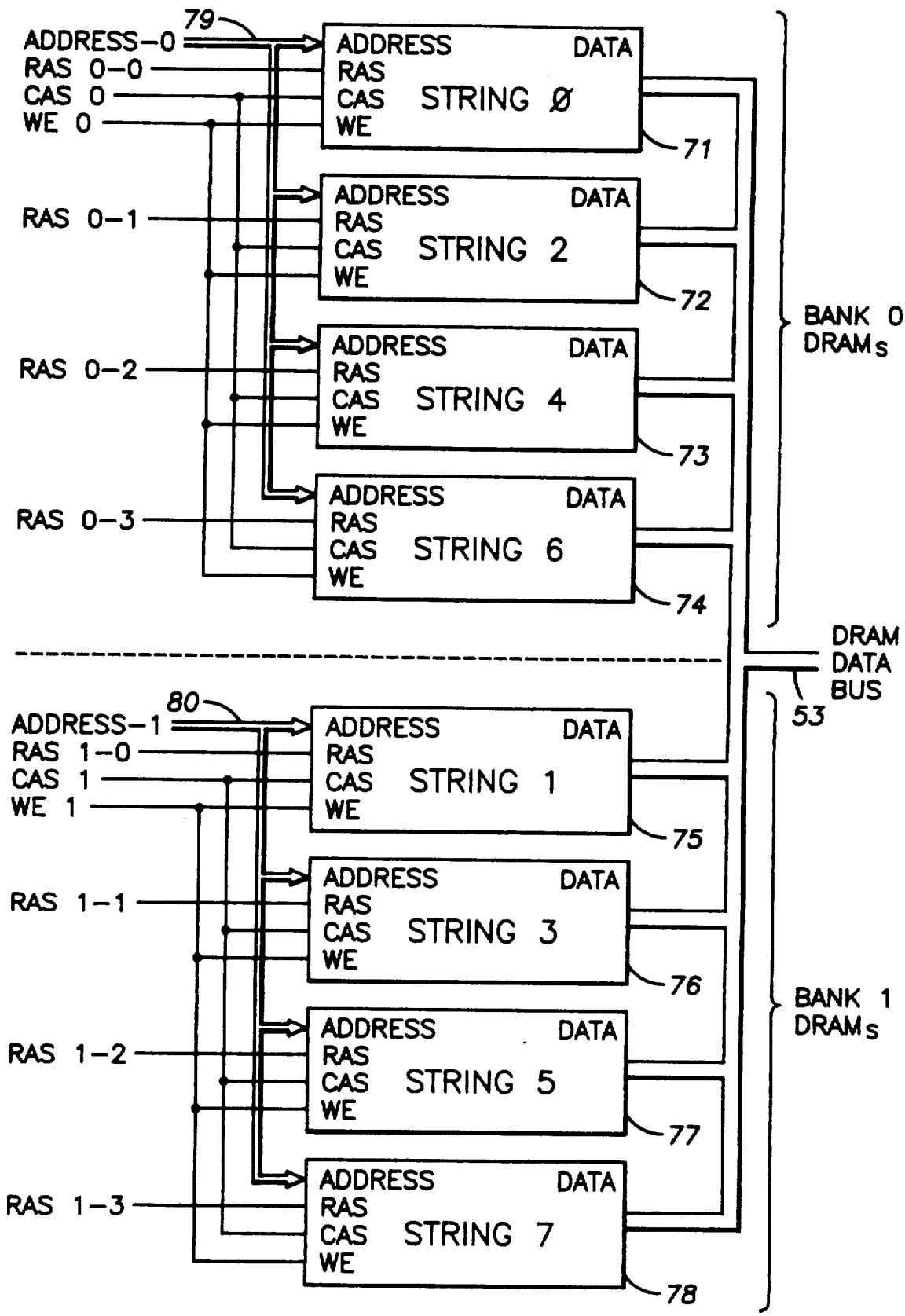
FIG. 4 is a detailed schematic diagram of the two dynamic random access memory banks of the computer system of FIG. 3.

Turning now to FIG. 4, there is shown a schematic diagram of the interconnection of strings of DRAMs 71, 72, 73, 74, 75, 76, 77, 78 in each of the two memory banks (51, 52 in FIG. 3). The strings of DRAMs 71, 72, 73, 74, 75, 76, 77, 78 all share the common DRAM data bus 53. Each of the strings, for example, includes enough DRAMs to assert a bit upon each data line of the DRAM data bus 53. In other words, each line of the DRAM data bus 53 is connected to one data terminal of one DRAM in each of the eight strings 71, 72, 73, 74, 75, 76, 77, 78. In a preferred embodiment, for example, the DRAM data bus 53 includes 576 lines, each DRAM chip has four data terminals, and each of the eight strings includes 144 DRAM chips. Preferably the 576 lines in the DRAM data bus 53 convey 512 data bits and 64 parity bits used for error correction of the data bits.

The DRAMs in each string have address and control terminals which are wired in parallel in each string. In addition, all of the strings in each bank share a common respective address bus. The strings 71, 72, 73, 74 in the first bank share a first address bus 79, and the strings 75, 76, 77, 78 in the second bank share a second address bus 80. As shown in FIG. 3, the address bus 79 is driven by the first address buffer 60, and the address bus 80 is driven by the second address buffer 61. As shown in FIG. 4, each of the strings has lines conveying a row address strobe (RAS), a column address strobe (CAS) and a write enable (WE) signal. Each string is supplied with an independent row address strobe signal. All four strings 71, 72, 73, 74 in the first memory bank receive a common column address strobe signal (CAS 0), and all of the four strings 75, 76, 77, 78 in the second memory bank receive a common column address strobe signal (CAS 1). In a similar fashion, all four strings 71, 72, 73, 74 in the first bank receive a common write enable signal (WE 0), and all four strings 75, 76, 77, 78 in the second bank also receive a common write enable signal (WE 1).

It should be apparent from FIG. 4 that the four strings 71, 72, 73, 74 in the first memory bank can be operated independently of the four strings 75, 76, 77, 78 in the second memory bank, except for possible contention over the common DRAM data bus 53. Moreover, the strings in FIG. 4 are labeled as string 0 to string 7 with the even numbered strings in the first bank and the odd numbered strings in the second bank. As will be further described below with reference to FIG. 5, the even numbered strings correspond to even numbered physical word addresses, and the odd numbered strings correspond to odd physical word addresses. Therefore, the strings are interleaved so that multiple word memory access operations accessing words having contiguous word address require alternate and coordinated accessing of both of the memory banks.

Figure 5:
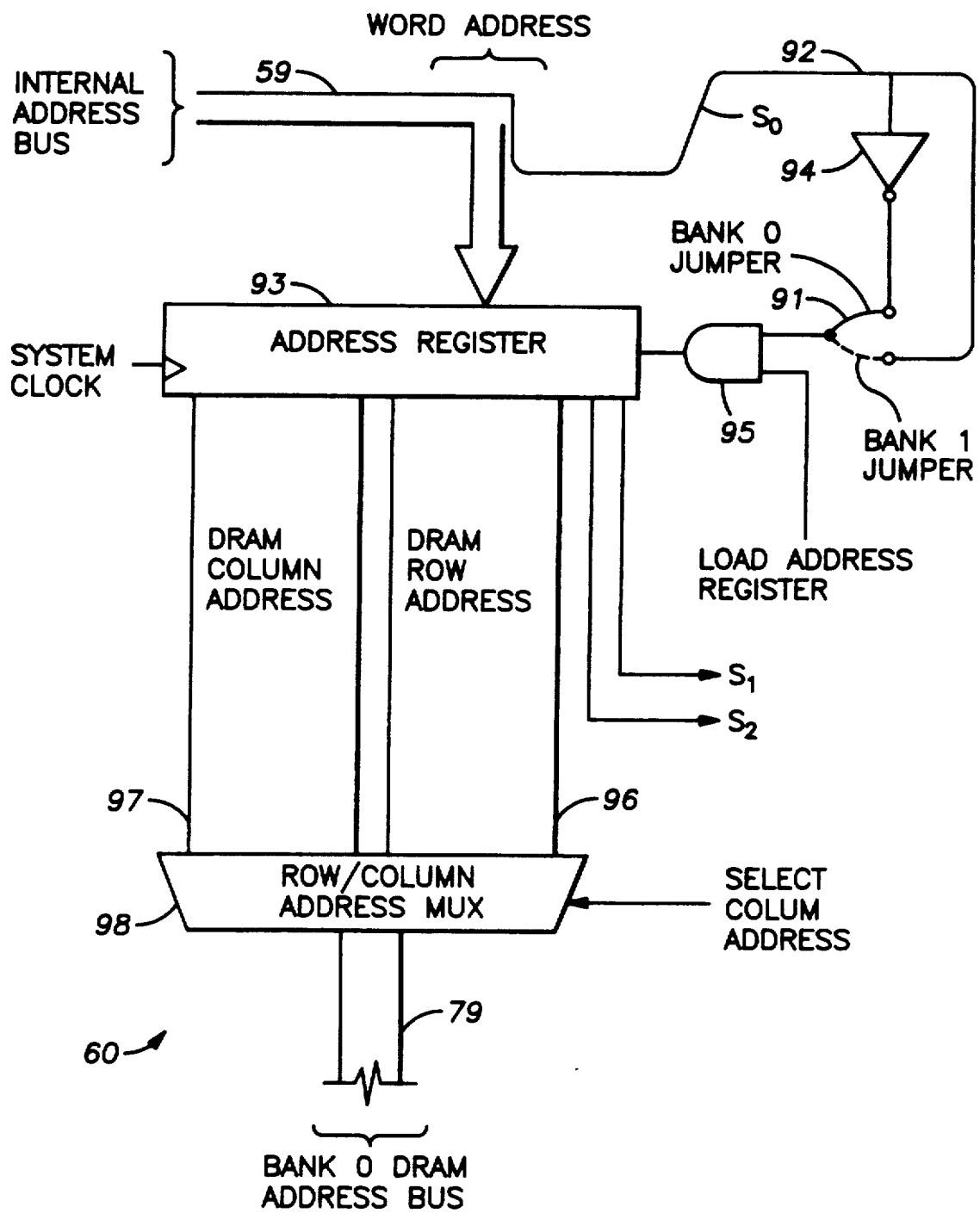
FIG. 5 is a schematic diagram of an address buffer used in the computer system of FIG. 3.

Turning now to FIG. 5, there is shown a schematic diagram of the first address buffer 60. The circuitry for the second address buffer 61 of FIG. 3 is similar except that a jumper 91 should be moved from the bank 0 position as shown to the bank 1 position. The address buffer 60 receives the internal address bus 59 and feeds all but a least significant $S_0$ line 92 to an address register 93. The $S_0$ bit on the line 92 designates whether the string number is odd or even. Therefore, in response to a LOAD ADDRESS REGISTER signal from the system bus interface (58 in FIG. 3), the address register 93 is loaded when the $S_0$ e bit is a logic 0. The enable signal to the address register 93 is provided by an inverter 94 and an AND gate 95.

The outputs of the address register 93 correspond to various string and address signals. The two least significant bits from the address register 93 are a bit $S_1$ and a bit $S_2$ which, when concatenated with the bit $S_0$, indicate a string number corresponding to the DRAM strings 0–7 shown in FIG. 4. The outputs of the address register 93 convey a DRAM row address 96 and a DRAM column address 97 which are supplied to inputs of a row/column address multiplexer 98. The row-/column multiplexer asserts either the DRAM row address 96 or the DRAM column address 97 upon the DRAM address bus 79 to the first memory bank, depending upon the logic state of a "SELECT COLUMN ADDRESS" signal from the DRAM bank 0 timing generator (67 in FIG. 3).

Figure 6:
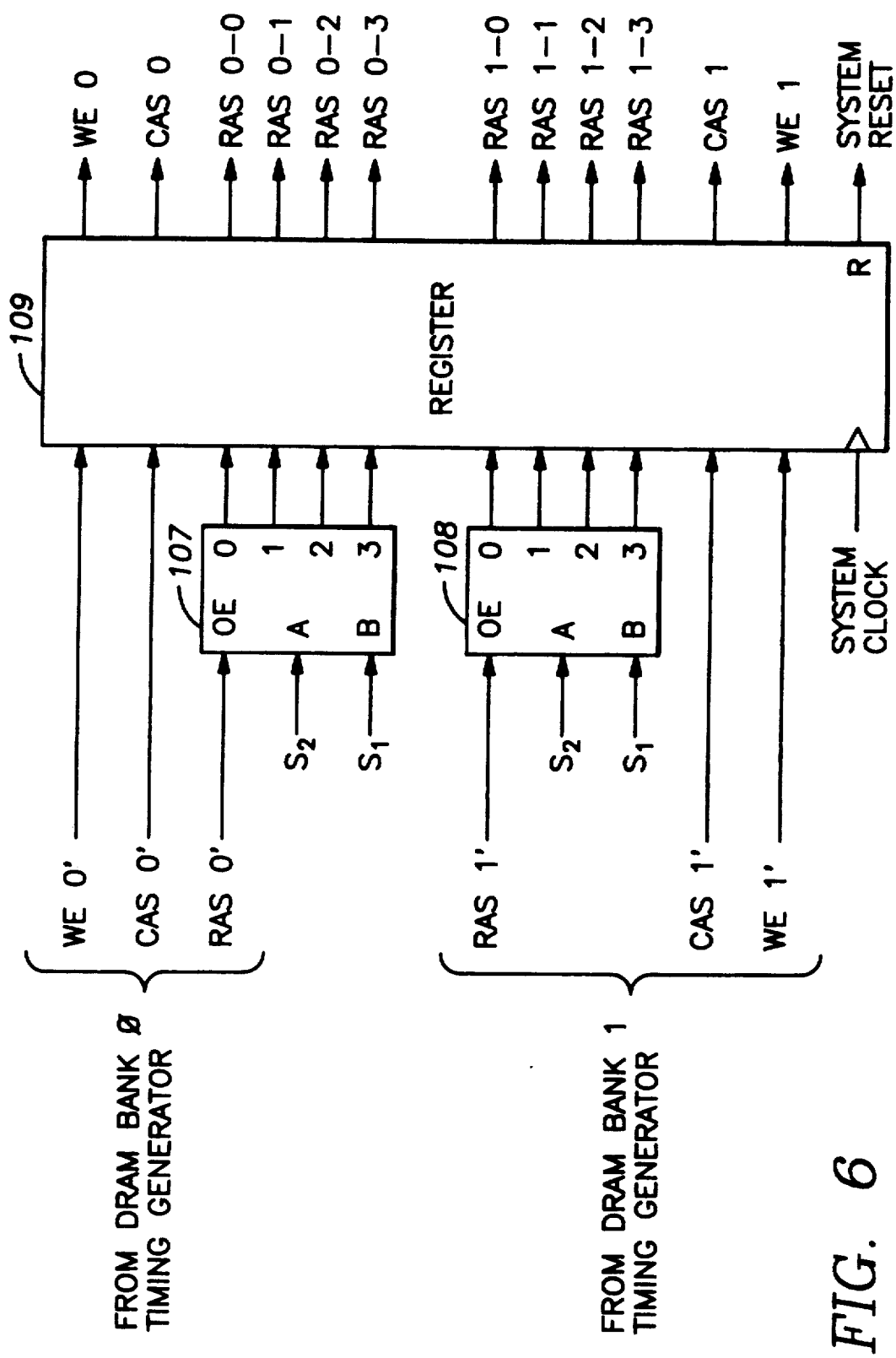
FIG. 6 is a schematic diagram of a control signal buffer used in each of the memory banks of FIG. 3.

Turning now to FIG. 6, the control signal generator 100 receives control signals WE 0', CAS 0', and RAS 0' from the bank 0 timing generator (67 in FIG. 3), and RAS 1', CAS 1', and WE 1' from the DRAM bank 1 timing generator (68 in FIG. 3). The control signal RAS 0' enables a decoder 107 decoding the two significant bits $S_2$ and $S_1$ of the string number to provide four row address strobe signals, only one of which is asserted at any given time. In a similar fashion, the control signal RAS 1' enables a second decoder 108 decoding the two significant string number bits $S_2$ and $S_1$ to provide four row address strobe signals, only one of which is asserted at any given time. The control signals WE 0', CAS 0', CAS 1', and WE 1', as well as the outputs of the decoders 107, 108 are received in a register 109 to provide the control signals supplied to the DRAM strings in the DRAM memory banks, as shown in FIG. 4.

Figure 7:
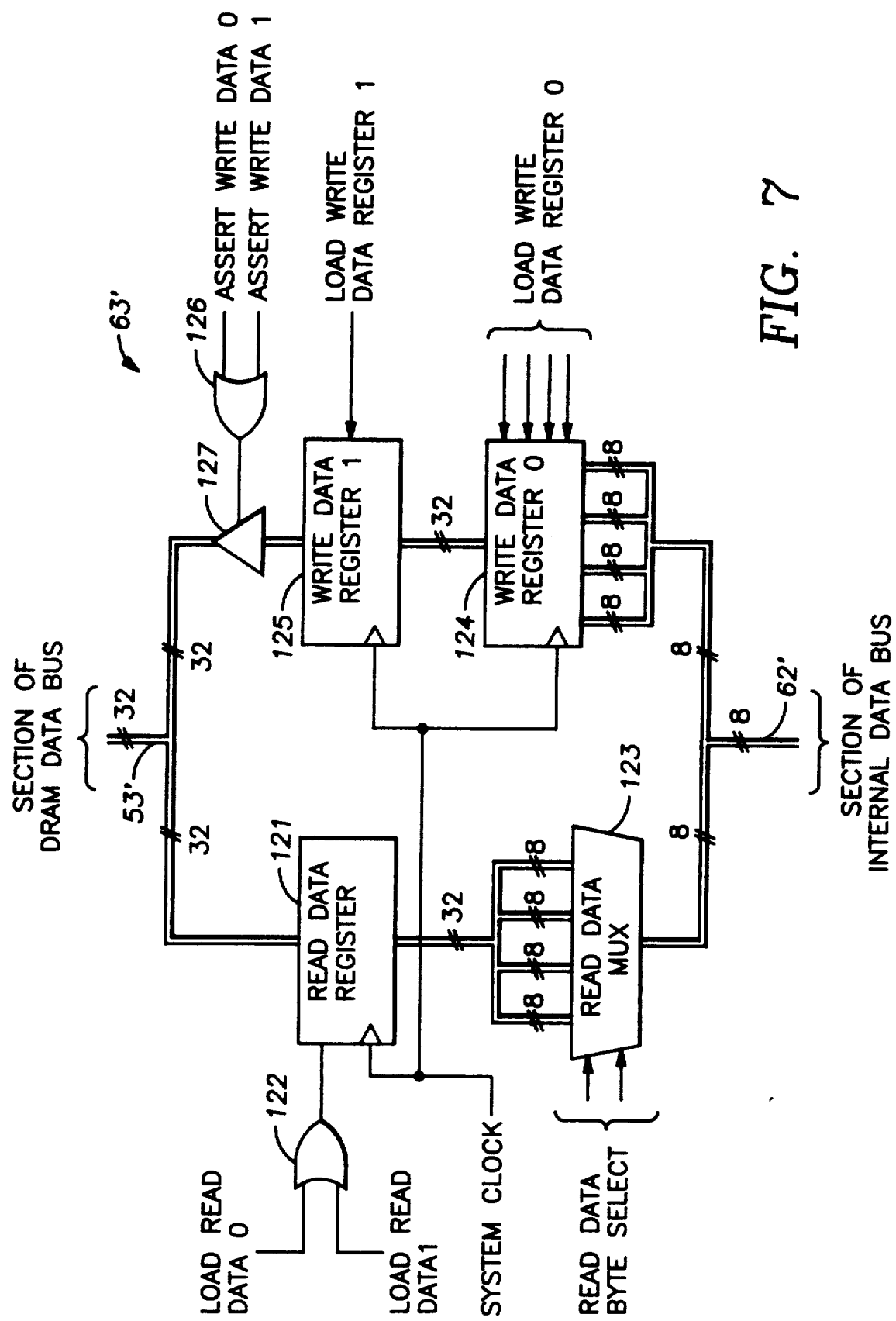
FIG. 7 is a schematic diagram of a section of a data buffer used in the computer system of FIG. 3.

Turning now to FIG. 7, there is shown a schematic diagram of a section 63' of the data buffer (63 in FIG. 3) for a thirty-two line section 53' of the DRAM data bus (53 in FIG. 3). The data buffer (63 in FIG. 3), for example, includes eighteen of the sections 63' to provide a data buffer 63 between a DRAM data bus (53 in FIG. 3) having 576 data lines and an internal data bus (62 in FIG. 3) having 144 data lines.

During a read operation, thirty-two bits of data are asserted on the section 53' of the DRAM data bus 53 by a string of DRAMs. These data are received in a read data register 121 at a particular state in the read sequence. At this time, a LOAD READ DATA signal is asserted by either the first DRAM bank timing generator (67 in FIG. 3) or the second DRAM bank timing generator (68 in FIG. 3). These signals from the first and second timing generators are combined by an OR gate 122 and asserted as a load enable signal to the read data registers 121.

The internal data bus 62 in the memory unit may operate about four times faster than the rate at which data can be alternately read from both of the DRAM data banks. Therefore, the internal data bus 62 need only use one-quarter of the number of data lines used in the DRAM data bus 53, and consequently the section 63' of the data buffer (63 in FIG. 3) interconnects an eight-line section 62' of the internal data bus (62 in FIG. 3) to the thirty-two line section 53' of the DRAM data bus (53 in FIG. 3). A particular byte out of the thirty-two bits on the section 62' of the DRAM data bus is selected by a read data multiplexer 123 operated by read data byte select signals from the system bus interface (58 in FIG. 3). The size of each bus in FIG. 7 is indicated by numerals next to double-slash lead lines.

During a write operation, data proceeds through the data buffer 63 in the opposite direction. During four cycles over the internal data bus 62, four bytes are loaded into a first write data register 124. The first write data register 124 has a width of thirty-two bits, and has four eight-bit-wide sections having separate parallel load enable signals. These parallel load enable signals are supplied by the system bus interface (58 in FIG. 3). So that the data buffer 63 functions as a first-in, first-out queue, the data buffer 63 includes a second write data register 125 controlled by a load write data register 1 signal supplied by the system bus interface (58 in FIG. 3). The write data is held in the second write data register 125 until it is asserted on the DRAM data bus 53 and written into a string of DRAMs when one of the DRAM bank timing generators (67, 68 in FIG. 3) asserts an ASSERT WRITE DATA signal. The AS- SERT WRITE DATA signals from the two timing generators are combined by an OR gate 126 and used to enable a tri-state bus driver 127.

Figure 8:
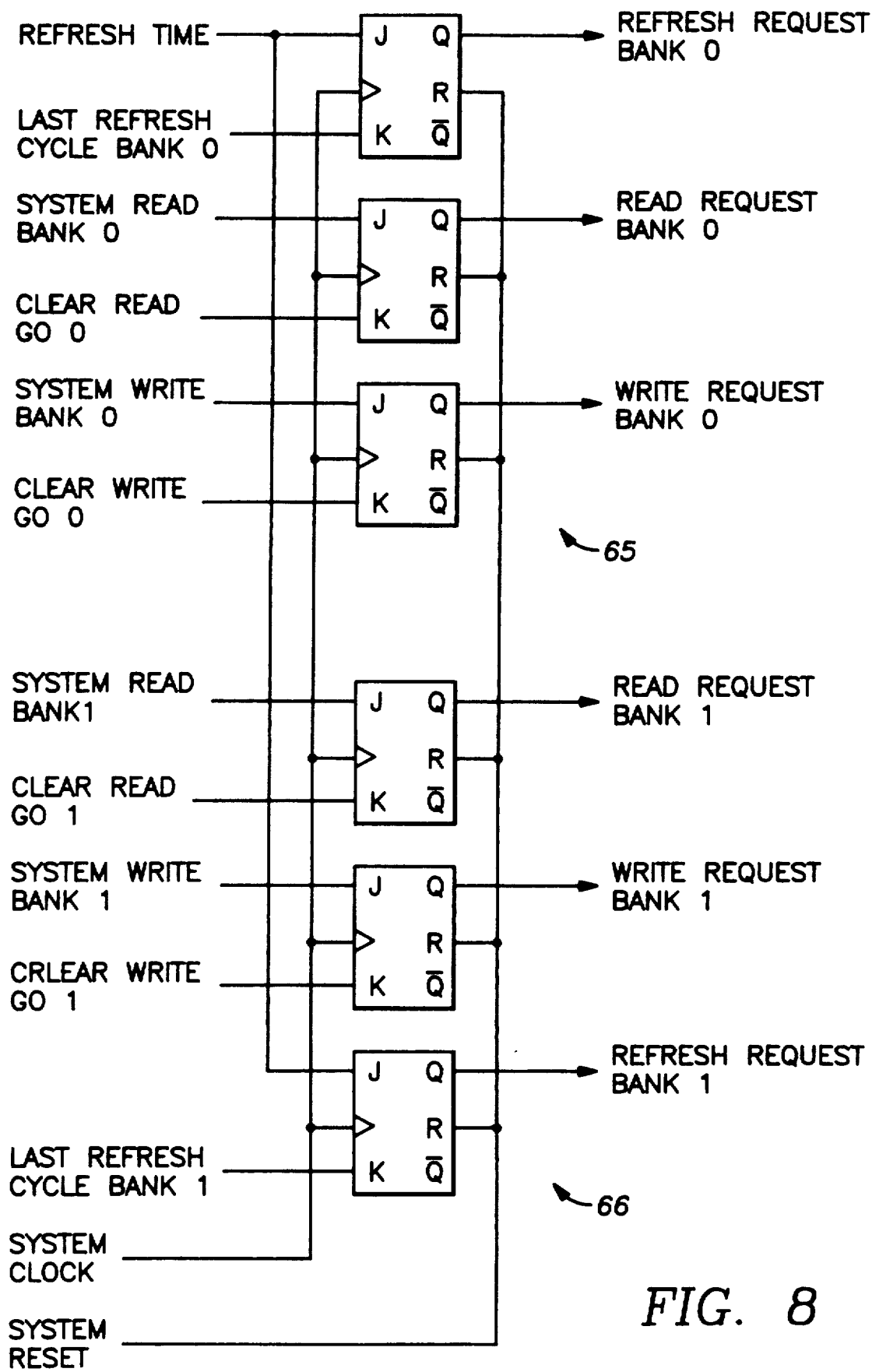
FIG. 8 is a schematic diagram of request buffers used in the computer system of FIG. 3.

Turning now to FIG. 8, there is shown a schematic diagram for the request buffers 65 and 66 for the first and second memory banks. As shown in FIG. 8, the request buffers are made of J/K flip-flops which are set by the bank request logic (64 in FIG. 3) and ar reset by commitment signals from the respective DRAM bank timing generators (67, 68 in FIG. 3).

Figure 9:
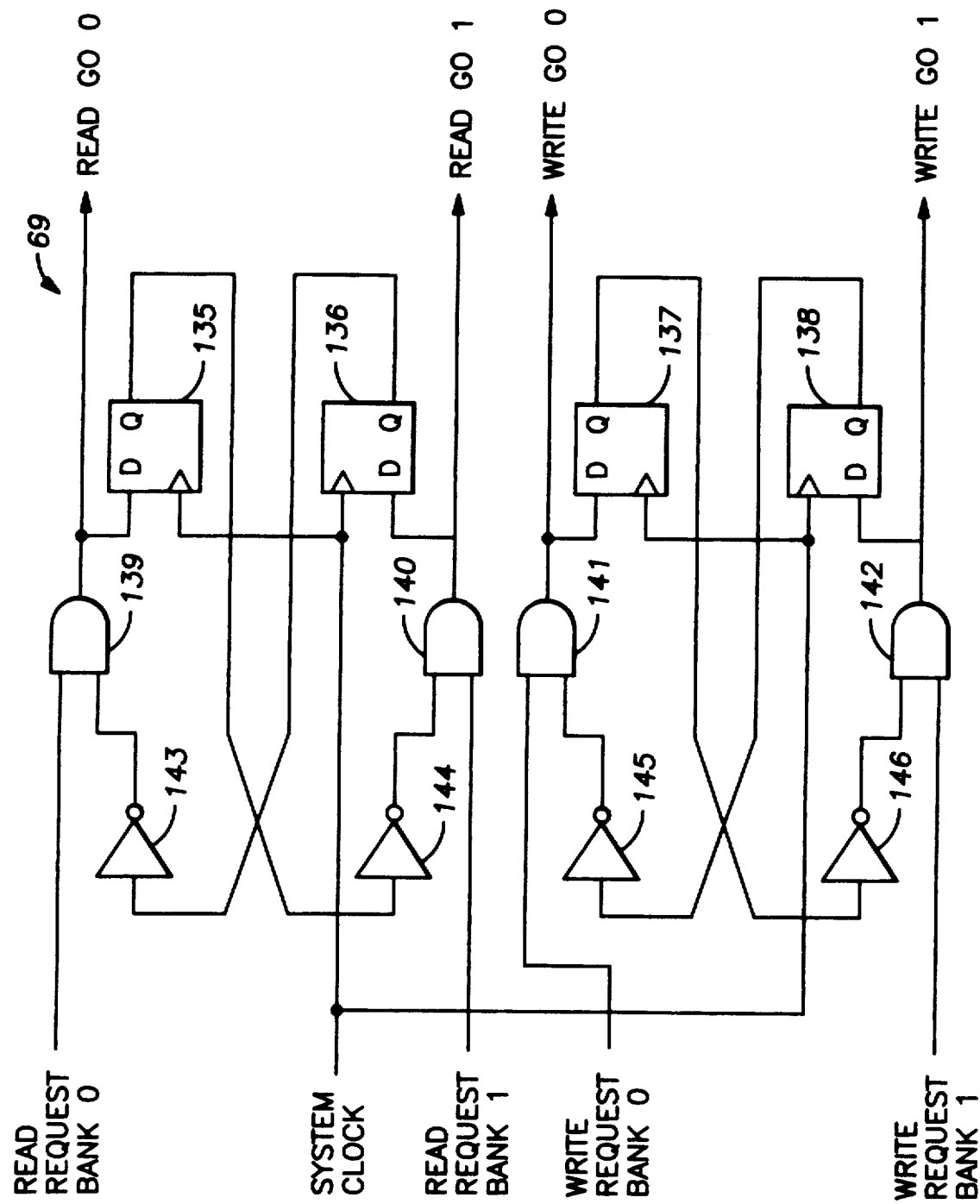
FIG. 9 is a schematic diagram of priority logic used in the computer system of FIG. 3.

Turning now to FIG. 9, there is shown a schematic diagram of the priority logic 69. The priority logic 69 arbitrates requests for the first memory bank with requests for the second memory bank, but does not arbitrate between the requests for each bank. Instead, combinational logic in each of the timing generators gives read requests priority over write requests for the same bank, as further described below with reference to FIGS. 11 and 12. Moreover, the priority logic 69 does not arbitrate between refresh requests because refresh operations do not use the common DRAM data bus (53 in FIG. 3) and therefore a refresh operation in one bank does not conflict with any memory access operations in the other bank.

More particularly, the priority logic arbitrates between a simultaneously pending read request for access to the first memory bank and read request for access to the second bank, and between a simultaneously pending write request for access to the first memory bank and write request for access to the second memory bank. Due to the interleaved nature of the DRAM strings in the DRAM memory banks as described above with respect to FIG. 4, such simultaneously pending read requests or write requests may occur when the bank request logic (64 in FIG. 3) recognizes a single read command or a single write command from the central processing unit (56 in FIG. 3) or the input/output unit (57 in FIG. 3). The priority logic 69 need not arbitrate between a read request for access to one bank and a write request for access to the other bank because the bank request logic loads such requests into the bank request buffers (65, 66 in FIG. 3) at sufficiently spaced intervals in time. Moreover, because the request buffers (65, 66 in FIG. 3) are loaded sequentially and not simultaneously by the bank request logic (64 in FIG. 3), the arbitration logic 69 will not receive two read requests or two write requests at the same time (i.e., the two read requests or two write requests will not have de-asserted to asserted transitions within the same cycle of the system clock). Therefore, in the memory unit 54 of FIG. 3, the priority logic 69 may arbitrate between the simultaneously pending read requests and between the simultaneously pending write requests on a first-come, first-served basis.

The priority logic 69 includes delay flip-flops 135, 136, 137 and 138 which are connected to AND gates 139, 140, 141, 142 and invertors 143, 144, 145, 146 to arbitrate the requests for similar service by different memory banks on a first come, first served basis. In other words, once a single request propagates through the priority logic 69, it will lock out a request for similar service by the other memory bank until the single request is cleared from the request buffer.

Figure 10:
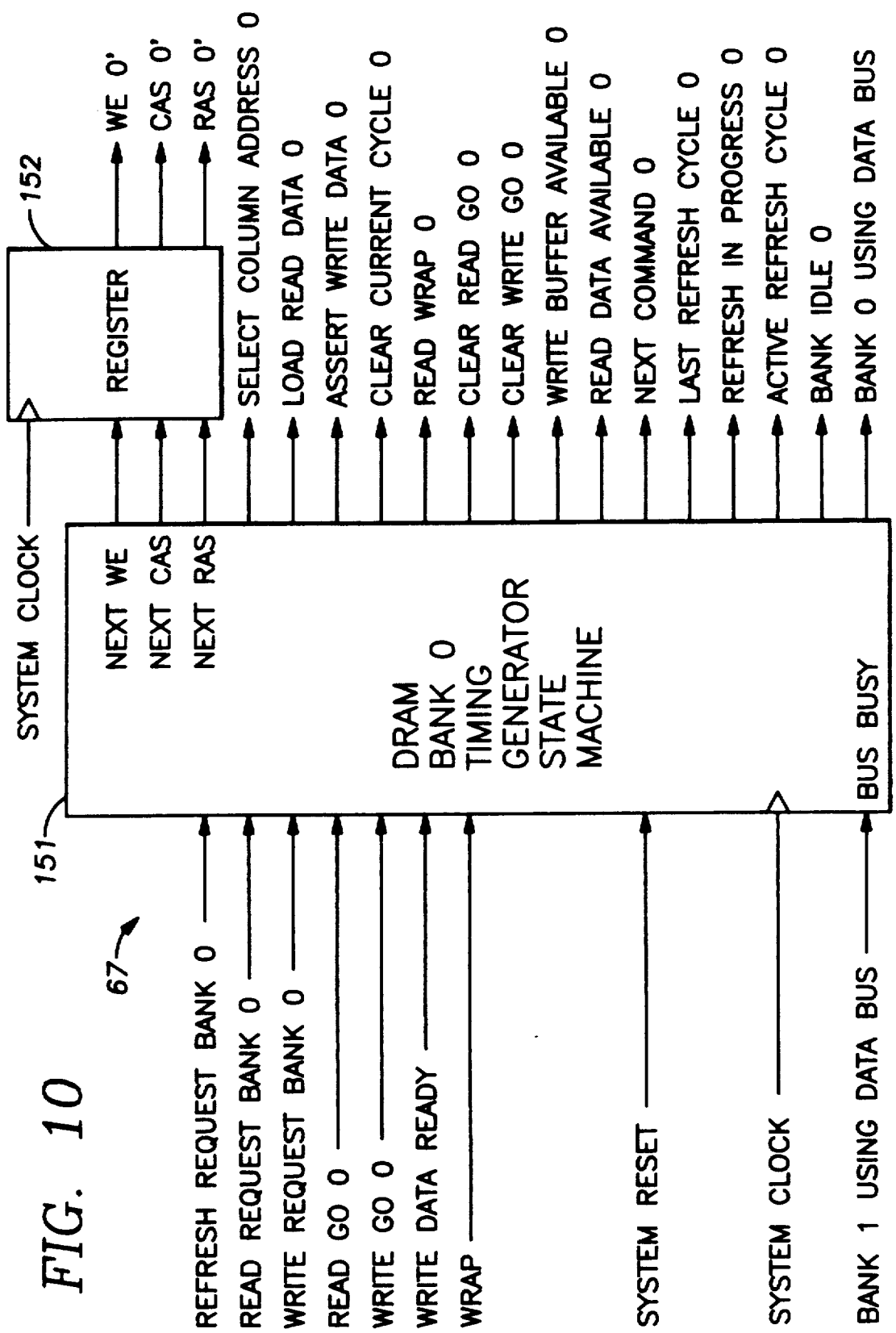
FIG. 10 is a block diagram of a DRAM bank timing generator used in the computer system of FIG. 3.

Turning now to FIG. 10, there is shown a block diagram of the DRAM bank 0 timing generator 67, which has the same construction as the DRAM bank 1 timing generator (68 in FIG. 3). The timing generator 67 includes a state machine 151 and a separate register 152 which supplies the DRAM control signals WE 0', CAS 0', and RAS 0'.

The inputs to the state machine 151 include the bank 0 refresh request, read request, and write request from the bank 0 request buffer 65 of FIG. 8. The state machine 151 further receives READ GO 0 and WRITE GO 0 grant signals from the priority logic 69 of FIG. 9. The state machine 151 further receives a WRITE DATA READY signal from the system bus interface 58 indicating that the second write data register (124 in FIG. 7) of the data buffer (63 in FIG. 3) has been loaded with data to be written to the DRAM memory bank. For execution of certain multi-word memory commands, the system bus interface (58 in FIG. 3) asserts a WRAP signal to the timing generator, and the WRAP signal is qualified by particular read sequence states of the state machine to provide a READ WRAP output signal. The timing generator 151 further receives a SYSTEM RESET signal, the SYSTEM CLOCK, and a cross-coupled BANK 1 USING DATA BUS signal from the DRAM bank 1 timing generator (68 in FIG. 3).

In addition to the NEXT WE, NEXT CAS, and NEXT RAS timing signals for the DRAM strings, the state machine 15 outputs the SELECT COLUMN ADDRESS signal which operates the row/column address multiplexer (98 in FIG. 5) of the bank 0 address buffer (60 in FIG. 3), the LOAD READ DATA 0 signal enabling the read data register (121 in FIG. 7) of the data buffer (63 in FIG. 3), and the ASSERT WRITE DATA 0 signal for asserting data upon the DRAM DATA BUS using the tri-state driver (127 in FIG. 7) of the data buffer (63 in FIG. 3). The state machine 151 asserts a CLEAR CURRENT CYCLE signal to the bank request logic 64 to indicate commitment of a request. The READ WRAP signal is generated from the WRAP signal as described above. The CLEAR READ GO 0 and CLEAR WRITE GO 0 signals are used to reset flip-flops in the bank 0 request buffer (65 in FIG. 8). The WRITE BUFFER AVAILABLE signal indicates to the system bus interface (58 in FIG. 3) that the second write data register (125 in FIG. 7) can be loaded with new write data. The READ DATA AVAILABLE signal from the timing generator indicates to the system bus interface (58 in FIG. 3) that selected bytes of new data from the read data register (121 in FIG. 7) can be transferred across the internal data bus (62 in FIG. 3) and asserted on the system bus (55 in FIG. 3) to complete a memory read operation. The NEXT COMMAND signal can be used by the system bus interface and the bank request logic 64 for decoding additional commands from the central processing unit or the input-/output unit. The LAST REFRESH CYCLE is used to clear a refresh request from the bank 0 request buffer (65 in FIG. 8). The REFRESH IN PROGRESS and ACTIVE REFRESH CYCLE signals can be used by the system bus interface 58 for monitoring and reporting the refreshing of the first DRAM memory bank. The BANK IDLE signal is used by the system bus interface 58 for monitoring the usage of the first DRAM memory bank. The BANK 0 USING DATA BUS signal is cross-coupled to the second DRAM timing generator (68 in FIG. 3).

Figure 11:
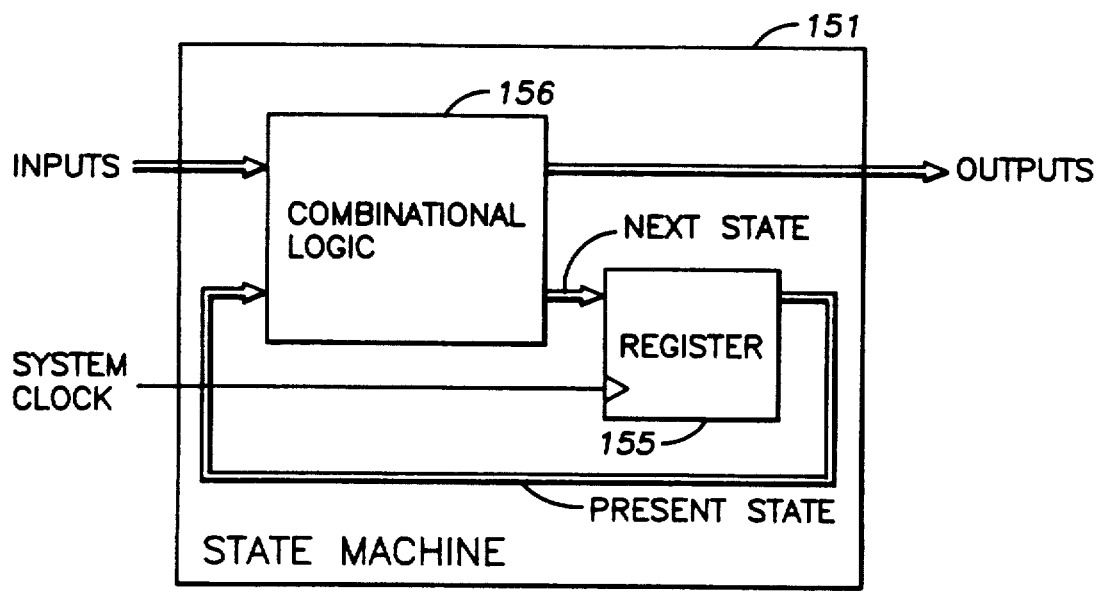
FIG. 11 is a block diagram of a state machine used in the DRAM bank timing generator of FIG. 10.

Turning now to FIG. 11, there is shown a block diagram of the first state machine 151, which has the same construction as the second state machine used for the DRAM bank 1 timing generator (68 in FIG. 3). As is conventional, the state machine 151 includes a register 155 which defines the present state of the state machine, and combinational logic 156 which generates the next state for the state machine as a Boolean logic function of the present state and the state machine inputs. The combinational logic 156 also includes logic for generating the state machine outputs as a Boolean logic function of the inputs and the present state of the state machine. The register 155 receives the next state signals which become the present state of the state machine for a next cycle of the system clock. Preferably, the state machine 151, as further described below, uses logic gates including NAND gates, NOR gates, and inverters, to make the combinational logic 156 in accordance with the Boolean equations given in Table below:

DRAM TIMING GENERATOR STATE MACHINE COMBINATIONAL LOGIC

NEXT_IDLE = (not (RCYC1 or RCYC2 or RCYC3 or RCYC4 or RCYC5 or RCYC6 or RCYC7 or RCYC8 or RCYC9 or RCYC10 or RCYC11 or WCYC1 or WCYC1A or WCYC2 or WCYC3 or WCYC3A or WCYC4 or WCYC6 or WCYC7 or WCYC8 or WCYC9 or WCYC10 or RFCY1 or RFCY2 or RFCY3 or RFCY4 or RFCY5 or RFCY6 or RFCY7 or RFCY8 or RFCY9 or RFCY10 or RFCY11) and not IDLE) or ((not (REFRESH_REQUEST and WRITE_DATA_AVAILABLE)) and IDLE) or (RESET and IDLE)

NEXT_RCYC1 = IDLE and READ_REQUEST and not (RESET or REFRESH_REQUEST)

NEXT_RCYC2 = RCYC1 or (RCYC2 and BUS_BUSY) or (RCYC2 and not READ_GO)

NEXT_RCYC3 = (RCYC2 and (not BUS_BUSY) and READ_GO) or (RCYC3 and BUS_BUSY)

NEXT_RCYC4 = RCYC3 and not BUS_BUSY

NEXT_RCYC5 = RCYC4

NEXT_RCYC6 = RCYC5

NEXT_RCYC7 = RCYC6

NEXT_RCYC8 = RCYC7

NEXT_RCYC9 = RCYC8

NEXT_RCYC10 = RCYC9

NEXT_RCYC11 = RCYC10

NEXT_WCYC1 = (IDLE and WRITE_REQUEST and WRITE_DATA_READY and not (RESET or REFRESH_REQUEST)) or (WCYC1 and not WRITE_GO)

NEXT_WCYC1A = WCYC1 and WRITE_GO

NEXT_WCYC2 = WCYC1A

NEXT_WCYC3 = WCYC2

NEXT_WCYC3A = (WCYC3 and BUS_BUSY) or (WCYC3A and BUS_BUSY)

NEXT_WCYC4 = (WCYC3A and not BUS_BUSY) or (WCYC3 and not BUS_BUSY)

NEXT_WCYC5 = WCYC4

NEXT_WCYC6 = WCYC5

NEXT_WCYC7 = WCYC6

NEXT_WCYC8 = WCYC7

NEXT_WCYC9 = WCYC8

NEXT_WCYC10 = WCYC9

NEXT_RFCY1 = IDLE and REFRESH_REQUEST and not RESET

NEXT_RFCY2 = RFCY1

NEXT_RFCY3 = RFCY2

NEXT_RFCY4 = RFCY3

NEXT_RFCY5 = RFCY4

NEXT_RFCY6 = RFCY5

NEXT_RFCY7 = RFCY6

NEXT_RFCY8 = RFCY7

NEXT_RFCY9 = RFCY8

NEXT_RFCY10 = RFCY9

NEXT_RFCY11 = RFCY10

NEXT_WE = WCYC3 or WCYC3A or WCYC4 or WCYC5 or WCYC6 or WCYC7 or WCYC8

NEXT_CAS = (RCYC2 and (BUS_BUSY or RESET or READ_GO)) or RCYC3 or RCYC4 or RCYC5 or WCYC5 or WCYC6 or RFCY1 or RFCY2 or RFCY3 or RFCY4 or RFCY5 or (REFRESH_REQUEST and IDLE)

NEXT_RAS = (IDLE and READ_REQUEST) or RCYC1 or RCYC2 or RCYC3 or RCYC4 or WCYC6 or WCYC1A or WCYC2 or WCYC3 or WCYC3A or WCYC4 or WCYC5 or RFCY1 or RFCY2 or RFCY3 or RFCY4 or RFCY5 or RFCY6 or NEXT_WCYC1A SELECT_COLUMN_ADDRESS = RCYC1 or RCYC2 or RCYC3 or RCYC4 or RCYC5 or RCYC6 or WCYC2 or WCYC3 or WCYC3A or WCYC4 or WCYC5 or WCYC6 or WCYC7 or RCYC4

LOAD_READ_DATA = RCYC3 and not BUS_BUSY

ASSERT_WRITE_DATA = ((WCYC3 or WCYC3A) and not BUS_BUSY) or WCYC4 or WCYC5 or WCYC6

CLEAR_CURRENT_CYCLE = WCYC1A or RCYC3 or RFCY2

READ_WRAP = WRAP and (RCYC3 or RCYC4)

CLEAR_READ_GO = RCYC3

CLEAR_WRITE_GO = WCYC2

WRITE_BUFFER_AVAILABLE = RESET or WCYC2

READ_DATA_AVAILABLE = RCYC3 and not BUS_BUSY

NEXT_COMMAND = RCYC7 or WCYC7 or RFCY7

LAST_REFRESH_CYCLE = RFCY11

REFRESH_IN_PROGRESS = (REFRESH_REQUEST and IDLE) or RFCY1 or RFCY2 or RFCY3 or RFCY4 or RFCY5 or RFCY6 or RFCY7 or RFCY8 or RFCY9 or RFCY10

ACTIVE_REFRESH_CYCLE = RFCY1 or RFCY2 or RFCY3 or RFCY4 or RFCY5 or RFCY6 or RFCY7 or RFCY8 or RFCY9 or RFCY10 or RFCY11

BANK_IDLE = IDLE

BANK_USING_DATA_BUS = (WCYC3 AND (not BUS_BUSY)) or WCYC3A or WCYC4 or WCYC5 or WCYC6 or WCYC7 or RCYC3 or RCYC4 or RCYC5 or RCYC6 or (RCYC2 and READ_GO)

The state register 155 is a series of D-type flip-flops, with one D flip-flop corresponding to each distinct state in the state diagram of FIGS. 12, 13, 14 and 15, except the implied states. The implied states corresponding to the single state of the state register 15 when the register 155 has all of its outputs de-asserted Otherwise, the register 155 has only one output asserted corresponding to one of the non-implied states in the state diagram of FIGS. 12-15. Although this construction of the state register 155 uses more flip-flops than is necessary, it simplifies the combinational logic 156 due to the linear strings of states that occur in the state diagram.

Figure 12:
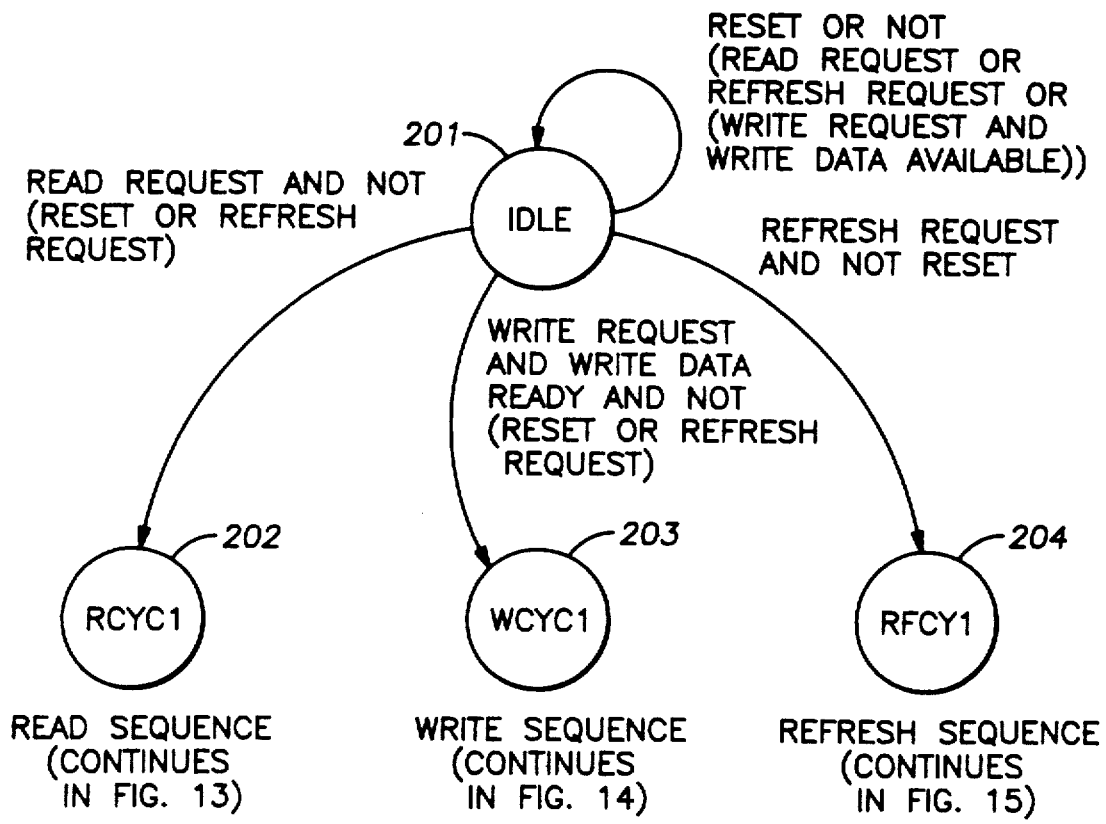
FIG. 12 is an initial portion of a state diagram for the state machine of FIG. 11.

Turning now to FIG. 12, there is shown the first four states of the state diagram for the state machine 151 in the state machines of the DRAM bank timing generators. From an idle state 201, the state machine enters either a read sequence starting with a first read cycle 202, a write sequence starting with a first write cycle 203, or a refresh sequence starting with a first refresh cycle 204. From the logic equations for the transitions as shown in FIG. 12, it should be apparent that the RESET signal has priority over any request and causes the state machine to remain in the idle state 201. The refresh request is given priority over both the read and write requests, and the read request is given priority over the write request.

Figure 13:
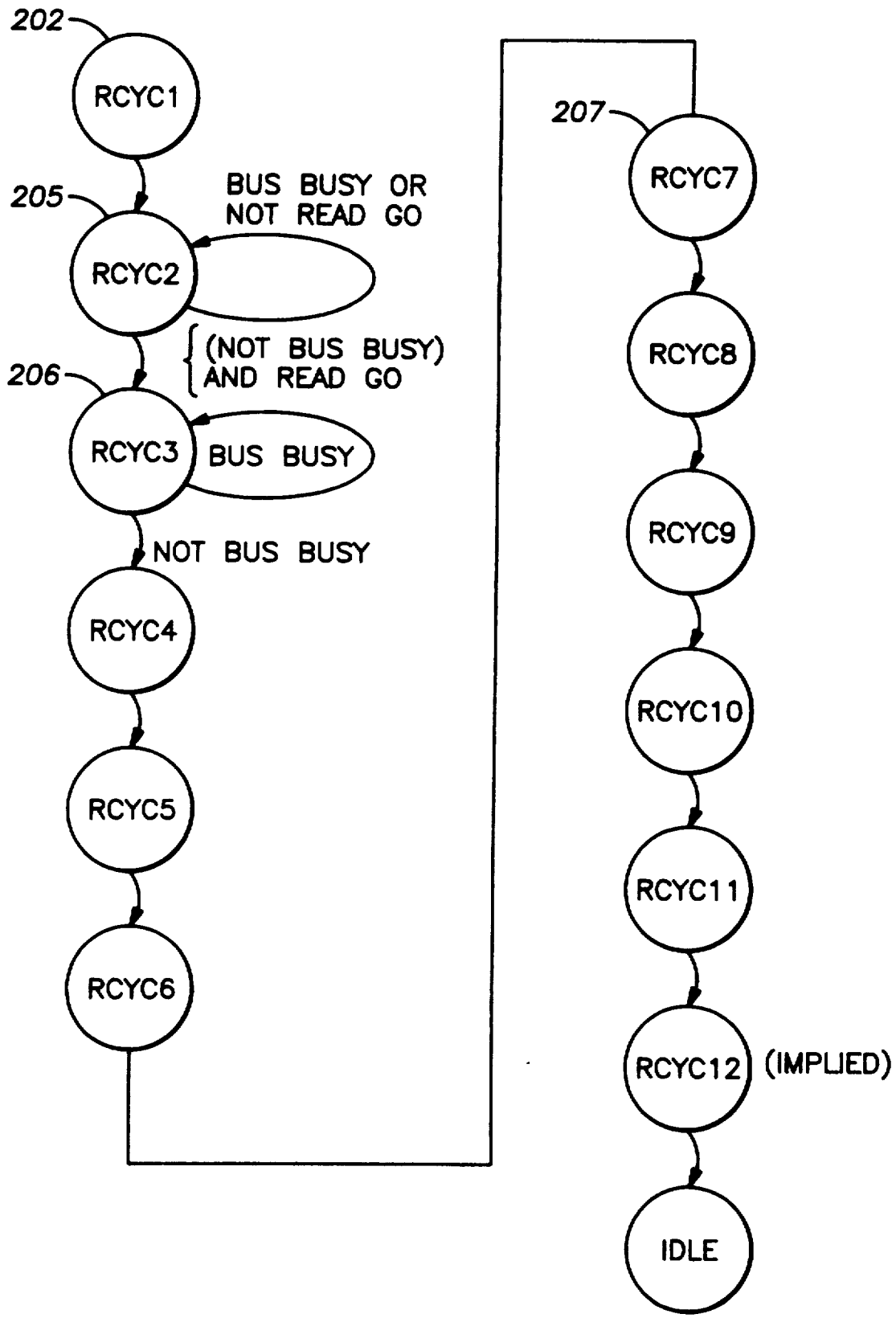
FIG. 13 is a second portion of the state diagram showing a sequence of states for controlling a memory bank to perform a read operation.

The read sequence is shown in detail in FIG. 13. The write sequence is shown in detail in FIG. 14, and the refresh sequence is shown in detail in FIG. 15. As is evident from the Boolean equations in the above Table I, the logic for generating the "BANK_USING_DATA_BUS" output signal is somewhat more complex than the previous example of FIG. 2 so that a state machine can take control of the data bus as soon as possible in either the read sequence or the write sequence.

In the read sequence of FIG. 13, the "BANK_USING_DATA_BUS" signal is first asserted in a state 205 (RCYC2) when the READ_GO grant signal is asserted. In the next state 206 (RCYC3), the "CLEAR_READ_GO" commitment signal is asserted. The "BANK_USING_DATA_BUS" signal remains asserted in state 206 (RCYC3) and the following states, until it is de-asserted in state 207 (RCYC7). The read sequence of FIG. 13 also permits cycling of the DRAMs to begin before the DRAM data bus is available. This advantage should be apparent from the Boolean equations of Table I for the RAS and CAS signals, which show that generation of the RAS signal for a read operation begins in the idle state when the READ_REQUEST signal is asserted, and generation of the CAS signal begins in the cycle 205 (RCYC2) when the READ_GO signal is asserted.

The write sequence of FIG. 14 has similar complexities so that "wait cycles" are eliminated. The CLEAR_WRITE_GO commitment signal is asserted in a state 211. The "BANK_USING_DATA_BUS" signal is first asserted in a state 212 (WCYC3) when the bus is not busy or otherwise in a state 213 (WCYC3A). The "BANK_USING_DATA_BUS" signal remains asserted until a state 214 (WCYC8). RAS signals begin immediately in state 203 (WCYC1), and generation of the CAS signal begins in state 215 (WCYC5).

In view of the above, there has been described a digital electronic system for controlling conflicting users of a shared resource such as a bus in a digital computer. The system includes cross-coupled state machines that permit a respective user to proceed with exclusive use of the shared resource as soon as any other user is finished with exclusive use of the shared resource. Possible contention due to the cross-coupling of the state machines is prevented by priority logic that arbitrates between requests for different users. Preferably each state machine arbitrates among simultaneous requests for the services of its user by governing transitions from an idle state to a respective sequence of states for each kind of request. Sequencing through each sequence of states is responsive to a respective grant signal from the priority logic and the busy signals of the other state machines.

Various modifications of the specific example given above should be apparent to a person of ordinary skill in the art. Although only two state machines are shown in the specific example of FIG. 3, it should be apparent that the busy signals of more than two state machines can be cross-coupled by using OR gates to combine the busy signals such that the busy signal input of each state machine receives the logical OR of the busy signals of the other state machines. Moreover, various kinds of priority logic for arbitrating among more than two request signals are well known. Kent et al., U.S. Pat. No. 4,897,833, issued Jan. 30, 1990 and incorporated herein by reference, for example, discloses priority logic for arbitrating among requests for multiple users and two different classes of requests for each user according to a rotational priority scheme.

What is claimed:

1. A digital electronic system for controlling conflicting users of a shared resource, said conflicting users including a first user and a second user, said digital electronic system comprising, in combination, a first state machine for controlling said first user;

a second state machine for controlling said second user; and priority logic having a first input for receiving requests for services of said first user, a second input for receiving requests for services of said second user, and first and second outputs for asserting either a first grant signal on said first output to said first state machine or a second grant signal on said second output to said second state machine;

wherein said first state machine has a first sequence of states during which said first user requires exclusive use of said shared resource; said second state machine has a second sequence of states during which said second user requires exclusive use of said shared resource; said first state machine has a third input connected to said first output for receiving said first grant signal from said priority logic, a third output for providing a first busy signal during said first sequence of states when said first state machine is busy controlling exclusive use of said shared resource by said first user, and a fourth input for receiving a second busy signal from said second state machine; said second state machine has a fifth input connected to said second output for receiving said second grant signal from said priority logic, a fourth output connected to said fourth input for providing said second busy signal during said second sequence of states when said second stage machine is busy controlling use of said shared resource by said second user, and a sixth input connected to said third output for receiving said first busy signal from said first state machine, said first state machine has combinational logic connected to said third and fourth inputs responsive to said first grant signal and said second busy signal for preventing sequencing of said first state machine to states in said first sequence during which said first user requires exclusive use of said shared resource, unless said first grant signal is asserted and said second busy signal is not asserted; and said second state machine has combinational logic connected to said fifth and sixth inputs responsive to said second grant signal and said first busy signal for preventing sequencing of said second state machine to states in said second sequence during which said second user requires exclusive use of said shared resource, unless said second grant signal is asserted and said first busy signal is not asserted;

whereby cross-coupling of said first and second busy signals between said first and second state machines permits each of said state machines to proceed with controlling exclusive use of said shared resource when the other one of the state machines is finished controlling exclusive use of said shared resource, and said priority logic prevents conflict between the cross-coupling of said first and second stage machines so that said first and second state machines do not simultaneously begin to control exclusive use of said shared resource.

2. The digital electronic system as claimed in claim 1, wherein said first and second state machines are substantially identical in construction.

3. The digital electronic system as claimed in claim 1, wherein said first state machine has an idle state, a first state in said first sequence of states reached from said idle state when said priority logic asserts said first grant signal, and a second state in said first sequence of states reached from said first state when said second state machine does not assert said second busy signal.

4. The electronic system as claimed in claim 1, wherein said first state machine has a seventh input connected to said first input of said priority logic for receiving said requests for services of said first user; and said first state machine has an idle state, a second state reached from said idle state when one of said requests for services of said first user is asserted on said seventh input, and a third state reached from said second state when said first grant signal from said priority logic is asserted on said third input.

5. The digital electronic system as claimed in claim 4, wherein said first state machine has a fourth state reached from said third state when said second busy signal from said second state machine is not asserted on said fourth input.

6. The digital electronic system as claimed in claim 4, wherein said third state is reached from said second state only when said second busy signal is not asserted on said fourth input.

7. The digital electronic system as claimed in claim 1, further comprising a request buffer having a fifth output connected to said first input for supplying to said priority logic requests for service of said first user, and
wherein said first state machine has a sixth output for providing a commitment signal when said first state machine sequences in said first sequence of states in response to said first grant signal.

8. The digital electronic system as claimed in claim 1, wherein said priority logic includes means for arbitrating among a plurality of requests of different priorities for the services of each of said first and second users.

9. The digital electronic system as claimed in claim 8, wherein said means for arbitrating arbitrates between requests for services of said first user and requests for services of said second user, but does not arbitrate between different requests for services of said first user and does not arbitrate between different requests for services of said second user; said combinational logic in said first state machine includes logic for arbitrating between different requests for services of said first user; and said combinational logic in said second state machine includes logic for arbitrating between different requests for services of said second user.

10. The digital electronic system as claimed in claim 9, wherein said logic for arbitrating between different requests of said first user governs transitions from an idle state of said first state machine to a respective sequence of states for each of said different requests for services of said first user, and said logic for arbitrating between different requests of said second user governs transitions from an idle state of said second state machine to a respective sequence of states for each of said different requests for services of said second user.

11. The digital electronic system as claimed in claim 1, wherein said shared resource is a bus in a computer system.

12. The digital electronic system as claimed in claim 11, wherein said users are memory banks and said shared bus is a data bus interconnecting said memory banks.

13. A digital electronic system for controlling conflicting users of a shared resource, said digital electronic system comprising, in combination,
request buffer means for asserting request signals requesting services of said users, said request signals including request signals of different priorities for the services of each of said users, said request buffer means including means for clearing said request signals in response to respective clear signals;
priority logic means for arbitrating among simultaneous ones to said request signals from said request buffer means to provide respective grant signals;
a plurality of state machines including a respective state machine for controlling each user, each of said stage machines having combinational logic defining an idle state and a sequence of states for controlling said each user to satisfy each request for services of said each user, each sequence of states being reached from said idle state in response to its respective request signal from said request buffer means, said combinational logic including logic for sequencing said state machine through said each sequence of states and asserting a respective clear signal to said request buffer means in response to its respective grant signal from said priority logic means,
wherein each state machine includes an output for asserting a busy signal for states where said each state machine is busy controlling exclusive use of said shared resource, said busy signal from said each state machine being cross-coupled to an input of another of said state machines, and wherein said combinational logic of said each state machine includes logic for preventing sequencing in said each sequence of states to states where said each state machine is busy, unless the busy signal cross-coupled from said another of said state machines is not asserted.

14. The digital electronic system as claimed in claim 13, wherein said state machines are substantially identical in construction.

15. The digital electronic system as claimed in claim 13, wherein said priority logic means includes means for arbitrating among a plurality of requests of different priorities for the services of each of said users.

16. The digital electronic system as claimed in claim 15, wherein said means for arbitrating arbitrates between requests for services of different ones of said users, but does not arbitrate between different requests for services of the same ones of said users, and said combinational logic in said each state machine includes logic for arbitrating between different requests for services of the user controlled by said each state machine.

17. The digital electronic system as claimed in claim 16, wherein said logic for arbitrating between different requests of the same one of said users governs transitions from an idle state of said each state machine to a respective sequence of states for each of said different requests for services of the same one of said users.

18. The digital electronic system as claimed in claim 13, wherein said shared resource is a bus in a computer system.

19. The digital electronic system as claimed in claim 18, wherein said users are memory banks and said shared bus is a data bus interconnecting said memory banks.

20. In a memory unit of a digital computer system, said digital computer system including a data processing unit generating memory access requests for access to said memory unit, the combination comprising:
   a first memory bank of DRAMs;
   a second memory bank of DRAMs coupled to said first memory bank by a common data bus;
   request buffer means for receiving and storing said memory access request from said data processing unit; said memory access requests stored in said request buffer means including read requests and write requests for access to said first memory bank, and read requests and write requests for access to said second memory bank; said request buffer means including means for clearing said read and write requests from said request buffer in response to respective read clear and write clear signals;
   priority logic means for arbitrating between a read request for one of the memory banks and a read request for the other one of the memory banks and arbitrating between a write request for one of the memory banks and a write request for the other one of the memory banks to provide read grant and write grant signals for each of said first and second memory banks;
   a first state machine for controlling the first memory bank and a second state machine for controlling the second memory bank, each of said state machines having combinational logic defining an idle state, a first sequence of states for controlling its respective memory bank to perform a read operation, and a second sequence of states for controlling its respective memory bank to perform a write operation, the first sequence of states being reached from said idle state in response to the read request from said request buffer means, the second sequence of states being reached from said idle state in response to the write request from said request buffer means, said combinational logic including logic for sequencing said each of said state machines through said first sequence of states and asserting a read clear signal to said request buffer means in response to the read grant signal from said priority logic means, and said combinational logic includes logic for sequencing said each of said state machines through said second sequence of states and asserting a write clear signal to said request buffer means in response to the write grant signal from said priority logic means,
   wherein said each of said state machines includes an output for asserting a busy signal for states where said each of said state machines is busy controlling exclusive use of said data bus, said busy signal from said each of said state machines being cross-coupled to an input of the other state machine, and wherein said combinational logic of said each of said state machines includes logic for preventing sequencing in said first and second sequences of states to states where said each state machine is busy, unless the busy signal cross-coupled from the other state machine is not asserted.

21. A method of controlling a first user with a first state machine and a second user with a second state machine so that said first user and said second user have exclusive use of a shared resource at different times, said first state machine asserting a first busy signal when controlling exclusive use of said shared resource, and said second state machine asserting a second busy signal when controlling exclusive use of said shared resource, said method including sequencing said first state machine in response to a first request signal and sequencing said second state machine in response to a second request signal, said method comprising the steps of:
   a) prioritizing said first and second request signals when said first and second request signals are asserted at the same time to either assert a first grant signal when said first request signal is granted priority or assert a second grant signal when said second request signal is granted priority;
   b) (i) sequencing said first state machine from a first state to a second state in response to said first request signal; (ii) sequencing said first state machine from said second state to a third state in response to said first grant signal; and (iii) after said sequencing of said first state machine from said second state to said third state, and when said second busy signal is not asserted by said second state machine, beginning control of exclusive use of said shared resource by said first user and asserting said first busy signal; and
   c) (i) sequencing said second state machine from a fourth state to a fifth state in response to said second request signal; (ii) sequencing said second state machine from said fifth state to a sixth state in response to said second grant signal; and (iii) after said sequencing of said second state machine from said fifth state to said sixth state, and when said first busy signal is not asserted by said first state machine, beginning control of exclusive use of said shared resource by said second user and asserting said second busy signal.

22. The method as claimed in claim 21, wherein said first user is idle during said first state and performs a first preparatory operation during said second state, and wherein said second user is idle during said fourth state and performs a second preparatory operation during said fifth state.

23. The method as claimed in claim 22, wherein said first and second users are first and second memory banks, said common resource is a data bus interconnecting said first and second memory banks, said first preparatory operation includes asserting a first address upon said first memory bank, and said second preparatory operation includes asserting a second address upon said second memory bank.

24. The method as claimed in claim 21, wherein said step of prioritizing is performed on a "first-come, first served basis" such that said first grant signal is asserted when said first request signal is first asserted before said second request signal, and said second grant signal is asserted when said second request signal is first asserted before said first request signal.

* * * * *